US008442709B2

(12) United States Patent
Larkin et al.

(10) Patent No.: US 8,442,709 B2
(45) Date of Patent: May 14, 2013

(54) UNDERWATER INVESTIGATION SYSTEM PROVIDING UNMANNED UNDERWATER VEHICLE (UUV) GUIDANCE BASED UPON UPDATED POSITION STATE ESTIMATES AND RELATED METHODS

(75) Inventors: Louis J. Larkin, Palm Beach Gardens, FL (US); Martin Juliano, Riviera Beach, FL (US); Katherine Janney, Palm Beach Gardens, FL (US); Sekhar Tangirala, Jupiter, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 497 days.

(21) Appl. No.: 12/635,867

(22) Filed: Dec. 11, 2009

(65) Prior Publication Data
US 2011/0144836 A1 Jun. 16, 2011

(51) Int. Cl.
*G05D 1/00* (2006.01)
(52) U.S. Cl.
USPC ............... 701/21; 701/408; 701/469; 367/2; 367/3; 114/312; 114/326; 114/328
(58) Field of Classification Search .................. 701/21, 701/408, 469; 367/2, 3; 114/312, 326, 328
See application file for complete search history.

(56) References Cited

U.S. PATENT DOCUMENTS

| | | | |
|---|---|---|---|
| 3,812,922 A | 5/1974 | Stechler | 175/6 |
| 3,998,204 A | 12/1976 | Fuchs et al. | 126/270 |
| 4,214,449 A | 7/1980 | Sorenson | 60/641 |
| 4,233,813 A | 11/1980 | Simmons | 60/496 |
| 4,325,216 A | 4/1982 | Mermis | 60/496 |
| RE31,026 E | 9/1982 | Shatto | 367/106 |
| 4,365,576 A | 12/1982 | Cook | 144/265 |
| 4,712,201 A | 12/1987 | Lagier | 367/92 |
| 5,305,135 A | 4/1994 | Chovan | 359/202 |
| 5,579,285 A | 11/1996 | Hubert | 367/133 |
| 6,501,704 B2* | 12/2002 | Nishimura | 367/130 |
| 6,532,192 B1* | 3/2003 | Reid | 367/127 |
| 6,657,585 B1* | 12/2003 | Kucik | 342/357.44 |
| 6,854,410 B1* | 2/2005 | King et al. | 114/244 |
| 6,961,657 B1* | 11/2005 | Wernli et al. | 701/468 |

(Continued)

FOREIGN PATENT DOCUMENTS

| | | |
|---|---|---|
| GB | 1 437 806 | 6/1976 |
| GB | 2 282 674 | 4/1995 |

*Primary Examiner* — Thomas Black
*Assistant Examiner* — Sara Lewandroski
(74) *Attorney, Agent, or Firm* — Allen, Dyer, Doppelt, Milbrath & Gilchrist, P.A.

(57) ABSTRACT

An underwater investigation system may include a host ship, a UUV including a propulsion device and a steering device, and at least one sonar system. The system may further include a guidance controller configured to initiate sonar range measurements between the host ship and the UUV using the at least one sonar system, and estimate a respective UUV position state relative to the host ship at the initiation of at least some of the sonar range value measurements to define a series of successive UUV position state estimates. The guidance controller may be further configured to update UUV position state estimates in the series based upon completion of their respective sonar range measurements, propagate the updates to subsequent UUV position state estimates in the series, and control the propulsion device and the steering device to guide movement of the UUV relative to the host ship based upon the updated position state estimates. The system thereby provides relatively precise guidance and navigation capabilities to maneuver the UUV relatively long distances away from the host ship.

24 Claims, 7 Drawing Sheets

U.S. PATENT DOCUMENTS

| | | | |
|---|---|---|---|
| 7,007,626 B2 | 3/2006 | Hobson et al. | 114/312 |
| 7,124,022 B2 * | 10/2006 | Carmichael et al. | 701/409 |
| 7,127,022 B1 * | 10/2006 | Dieguez | 375/375 |
| 7,139,647 B2 | 11/2006 | Larsen | 701/21 |
| 7,190,637 B2 | 3/2007 | Evans et al. | 367/133 |
| 7,296,530 B1 * | 11/2007 | Bernstein et al. | 114/322 |
| 2007/0104031 A1 * | 5/2007 | Bernard | 367/128 |
| 2007/0106462 A1 * | 5/2007 | Blain et al. | 701/207 |
| 2008/0002526 A1 | 1/2008 | Kirschner et al. | 367/87 |
| 2008/0037370 A1 * | 2/2008 | Crowell | 367/127 |
| 2009/0216444 A1 * | 8/2009 | Crowell | 701/213 |
| 2010/0246322 A1 * | 9/2010 | Welker | 367/15 |
| 2011/0064269 A1 * | 3/2011 | Pai M.M et al. | 382/103 |

* cited by examiner

UNDERWATER INVESTIGATION SYSTEM PROVIDING UNMANNED UNDERWATER VEHICLE (UUV) GUIDANCE BASED UPON UPDATED POSITION STATE ESTIMATES AND RELATED METHODS

FIELD OF THE INVENTION

The present invention relates to the field of underwater investigation systems, and, more particularly, to unmanned underwater vehicle (UUV) navigation and guidance systems and related methods.

BACKGROUND OF THE INVENTION

Unmanned underwater vehicles (UUVs) are used for various underwater exploration applications, including inspection of underwater structures (oil and gas platforms, etc.), mine neutralization, etc. As a result, it may be desirable that such UUVs be of relatively low cost, i.e., expendable. To keep the cost of UUVs low, precision underwater navigation components are typically not carried by the UUV.

One approach to guiding a low cost or expendable UUV is by a fiber-optic communications link connected between a host control ship and the UUV. Yet, in applications such as those noted above, it may be desirable for the host ship to deploy the UUV from a long stand-off distance, rather than deposit the UUV in close proximity to the area of interest. However, long stand-off distances require a relatively precise guidance and navigation capability to maneuver the UUV into a range where terminal homing sensors, such as video cameras, or a closed-loop guidance system may be used to guide the vehicle, for example.

Ultra-short baseline (USBL) is one technique that is used for underwater acoustic positioning. A conventional USBL system typically includes a transceiver, which is mounted under a ship, and a transponder/responder on the, seafloor, a towfish, or on a UUV. A computer, or "topside unit," is used to calculate a position from the ranges and bearings measured by the transceiver.

U.S. Pat. No. 6,854,410 is directed to an unmanned system for investigating underwater regions which utilizes an unmanned mothership and a plurality of UUVs. The mothership transports the UUVs to and from the vicinity of an underwater region, releases the UUVs into the water, and facilitates recovery of the UUVs from the water. Each UUV can traverse an underwater region, generate sonar and image data associated with the underwater region, and transmit the sonar and image data through the water for receipt and re-transmission by the mothership. A docking system mounted partially onboard the mothership and partially onboard each UUV couples each UUV to the mothership and selectively releases each UUV into the underwater region. A guidance system mounted partially onboard the mothership and partially onboard each UUV guides each UUV back to the docking system from positions in the water. The mothership and UUVs can also be equipped with a non-contact electrical energy transfer system so that each UUV can return to the mothership and re-charge onboard batteries while underwater.

Despite the advantages of such systems, further enhancements to UUV guidance and navigation systems may be desirable in certain applications.

SUMMARY OF THE INVENTION

In view of the foregoing background, it is therefore an object of the present invention to provide a system and related methods for controlling an unmanned underwater vehicle (UUV).

This and other objects, features, and advantages are provided by an underwater investigation system which may include a host ship, a UUV including a propulsion device and a steering device, and at least one sonar system. The system may further include a guidance controller configured to initiate sonar range measurements between the host ship and the UUV using the at least one sonar system, and estimate a respective UUV position state relative to the host ship at the initiation of at least some of the sonar range value measurements to define a series of successive UUV position state estimates. The guidance controller may be further configured to update UUV position state estimates in the series based upon completion of their respective sonar range measurements, propagate the updates to subsequent UUV position state estimates in the series, and control the propulsion device and the steering device to guide movement of the UUV relative to the host ship based upon the updated position state estimates. The system thereby provides relatively precise guidance and navigation capabilities to maneuver the UUV relatively long distances away from the host ship.

More particularly, the at least one sonar system may comprise a host transducer carried by the host ship and a UUV transducer carried by the UUV, and the guidance controller may be configured to initiate the sonar range measurements using ultra-short baseline (USBL). The guidance controller may be carried by the host ship. Furthermore, the system may further include a wired communications link coupled between the UUV and the guidance controller. Additionally, the guidance controller may be configured to communicate with the UUV using an acoustic communications (ACOMMS) link.

The guidance controller may include a Kalman filter for updating the UUV position state estimates and propagating the updates to subsequent UUV position state estimates in the series. The guidance controller may also include a delay filter configured to verify valid sonar range measurements prior to updating the UUV position state estimates. The guidance controller may also be configured to store the series of successive UUV position state estimates in a stack. By way of example, the stack may comprise a rolling stack. Furthermore, the UUV position state estimates may comprise mean and standard deviation position data.

A related guidance controller is also provided for guiding an unmanned underwater vehicle (UUV) comprising a propulsion device and a steering device relative to a host ship. The guidance controller may include a guidance module configured to initiate sonar range measurements between the host ship and the UUV using at least one sonar system. The controller may further include a position estimation module configured to estimate a respective UUV position state relative to the host ship at the initiation of at least some of the sonar range value measurements to define a series of successive UUV position state estimates, and update UUV position state estimates in the series based upon completion of their respective sonar range measurements, and propagate the updates to subsequent UUV position state estimates in the series. In addition, the guidance module may also be also configured to control the propulsion device and the steering device to guide movement of the UUV relative to the host ship based upon the updated position state estimates.

A related method for guiding an unmanned underwater vehicle (UUV) including a propulsion device and a steering device relative to a host ship. The method may include initiating sonar range measurements between a host ship and an unmanned underwater vehicle (UUV) using at least one sonar system, and estimating a respective UUV position state relative to the host ship at the initiation of at least some of the sonar range value measurements to define a series of successive UUV position state estimates. The method may further include updating UUV position state estimates in the series based upon completion of their respective sonar range measurements, and propagating the updates to subsequent UUV position state estimates in the series. The method may further include controlling the propulsion device and the steering device to guide movement of the UUV relative to the host ship based upon the updated position state estimates.

A related computer-readable medium having computer-executable instructions for causing a guidance controller to guide an unmanned underwater vehicle (UUV) comprising a propulsion device and a steering device relative to a host ship. The computer-readable medium may include a guidance module configured to initiate sonar range measurements between the host ship and the UUV using at least one sonar system, and a position estimation module. The position estimation module may be configured to estimate a respective UUV position state relative to the host ship at the initiation of at least some of the sonar range value measurements to define a series of successive UUV position state estimates, and update UUV position state estimates in the series based upon completion of their respective sonar range measurements, and propagate the updates to subsequent UUV position state estimates in the series. The guidance module may also be configured to control the propulsion device and the steering device to guide movement of the UUV relative to the host ship based upon the updated position state estimates.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
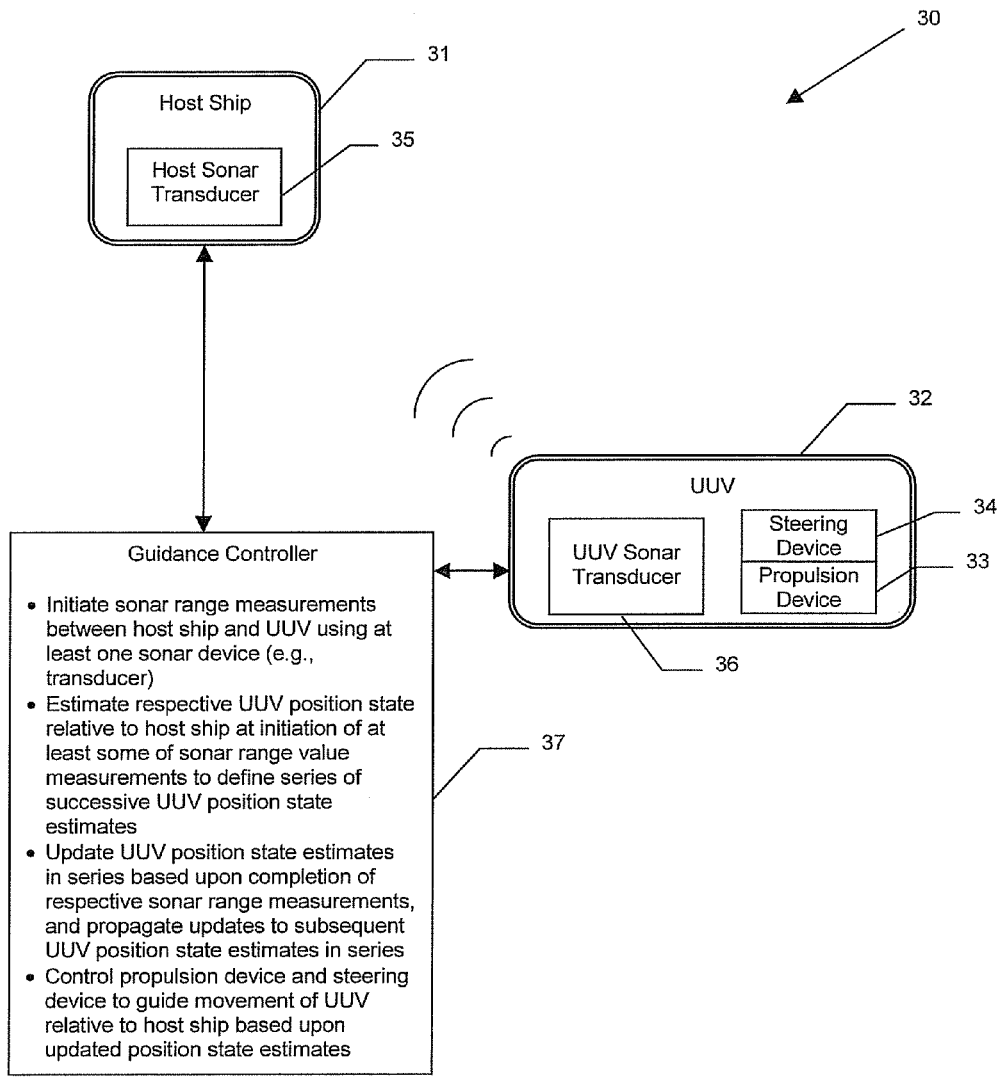
FIG. 1 is a schematic block diagram of an underwater investigation system in accordance with an embodiment of the invention.

Referring initially to FIG. 1, an underwater investigation system 30 is first described which illustratively includes a host ship 31, a UUV 32 including a propulsion device 33 (e.g., one or more propellers) and a steering device 34 (e.g., one or more rudders), and at least one sonar system. By way of example, the host ship 31 may be a surface vessel, or it may be a submersible vessel. One exemplary host ship that may be used is a Remote Multi-Mission Vehicle (RMMV), a twenty-three foot unmanned surface vehicle which provides transport, communication support and other logistics services to a variety of small UUVs. One exemplary UUV that may be adapted for use with the techniques described herein is the Archerfish, a remotely operated UUV that locates targets using sonar, and enables an operator to identify the target using video. However, other suitable host ships and UUVs may also be used in different embodiments, as will be appreciated by those skilled in the art.

In the illustrated example, both the host ship 31 and the UUV 32 have a respective host sonar transducer 35 and a UUV sonar transducer 36, which may be used for sonar range measurements using ultra-short baseline (USBL), as will be discussed further below. However, USBL need not be used in all embodiments. The host sonar transducer 35 may be implemented as an array of transducers which provides not only range data, but also a bearing and/or elevation angle to the UUV 32, as will be appreciated by those skilled in the art. Further, the host ship 31 may also include a current measurement device (not shown), such as an Acoustic Doppler Current Profiler (ADCP or ADP), for example, to account for the effects of water current on the host ship 31 and/or the UUV 32, as will also be appreciated by those skilled in the art.

Figure 4:
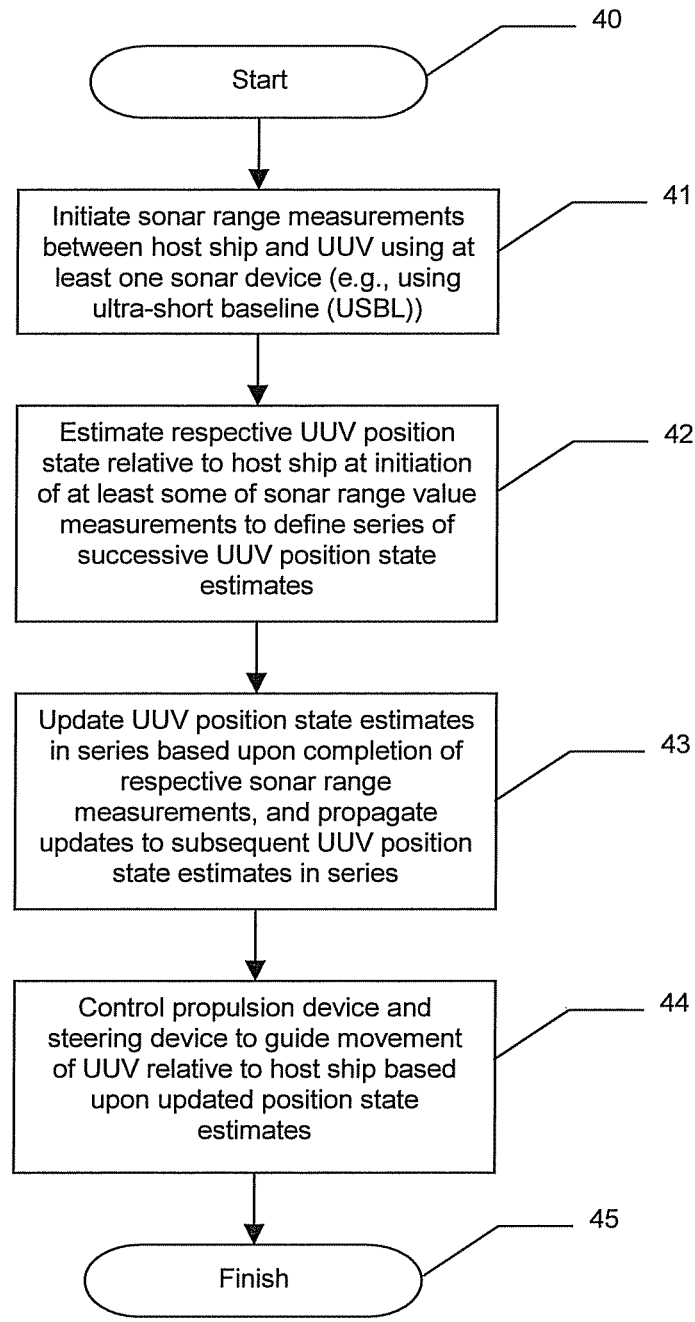
FIG. 4 is a flow diagram of a method for guiding a UUV in accordance with the invention.

The system 30 further illustratively includes a guidance controller 37. Operation of the guidance controller 37 will now be described with respect to FIG. 4. Beginning at Block 40, the guidance controller 37 is configured to initiate sonar range measurements between the host ship 31 and the UUV 32 using the sonar transducers 35, 36. As noted above, the sonar range measurements may be performed using USBL based upon initiation of a ping from the UUV sonar transducer 36, and the detection of the ping from the host sonar transducer 35, as will be appreciated by those skilled in the art. The UUV sonar transducer 36 may be instructed to initiate the ping from the guidance controller 37, which if carried by the host ship 31 may communicate with the UUV sonar transducer 36 via a communications link, as will be discussed further below, or responsive to a sonar transmission from the host sonar transducer 35. The guidance controller 37 may also advantageously provide pilot and/or closed-loop control capabilities for the UUV 32 in cooperation with one or more UUV sensor devices, e.g., the UUV sonar transducer 36, a video camera, etc., as will also be appreciated by those skilled in the art.

A traditional USBL system provides a sonar position measurement that may be affected by significant delay and erroneous position measurements due to noise, multi-path and other factors. The relatively long delays and position errors degrade the ability of a pilot or closed-loop controller to perform precision guidance due to the resulting position inaccuracies, as will be appreciated by those skilled in the art.

Figure 5:
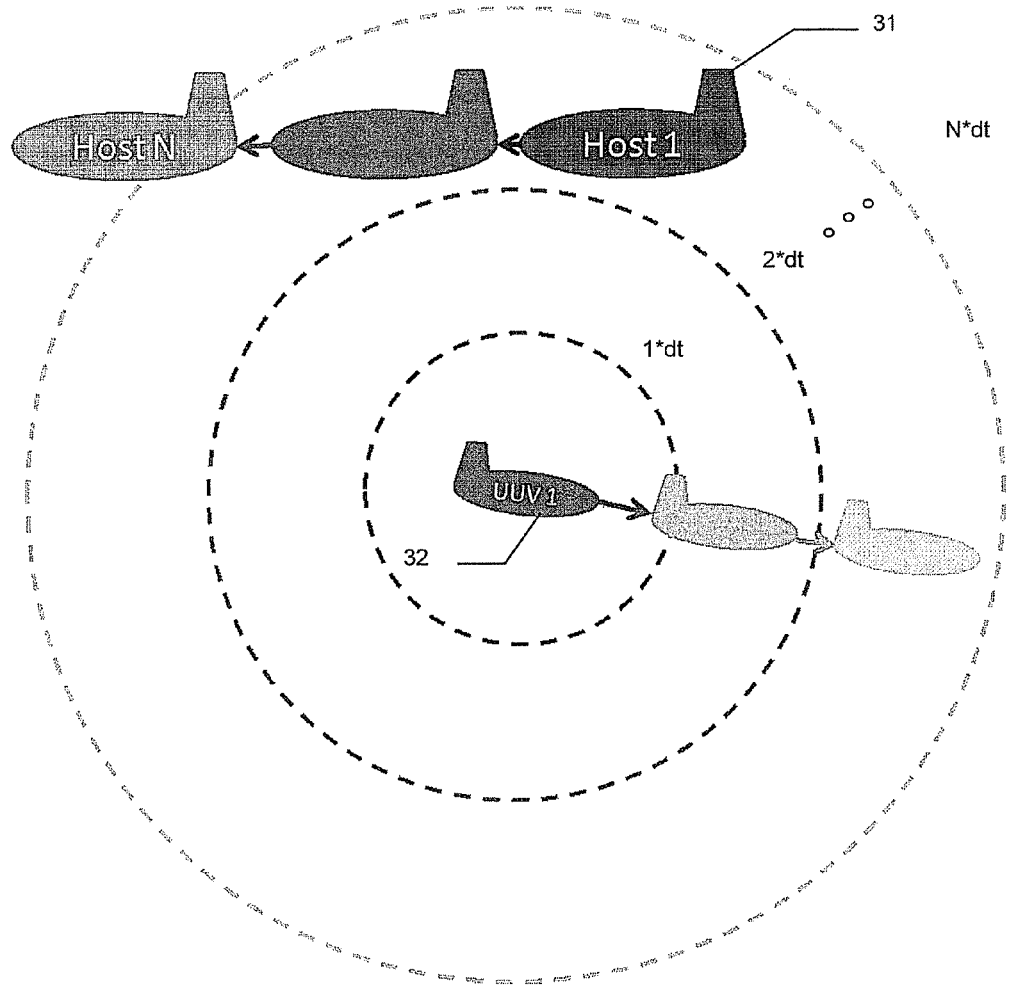
FIG. 5 is a schematic block diagram of a host ship and UUV illustrating acoustic delay which is accounted for by the guidance controller of FIG. 3.
Figure 6:
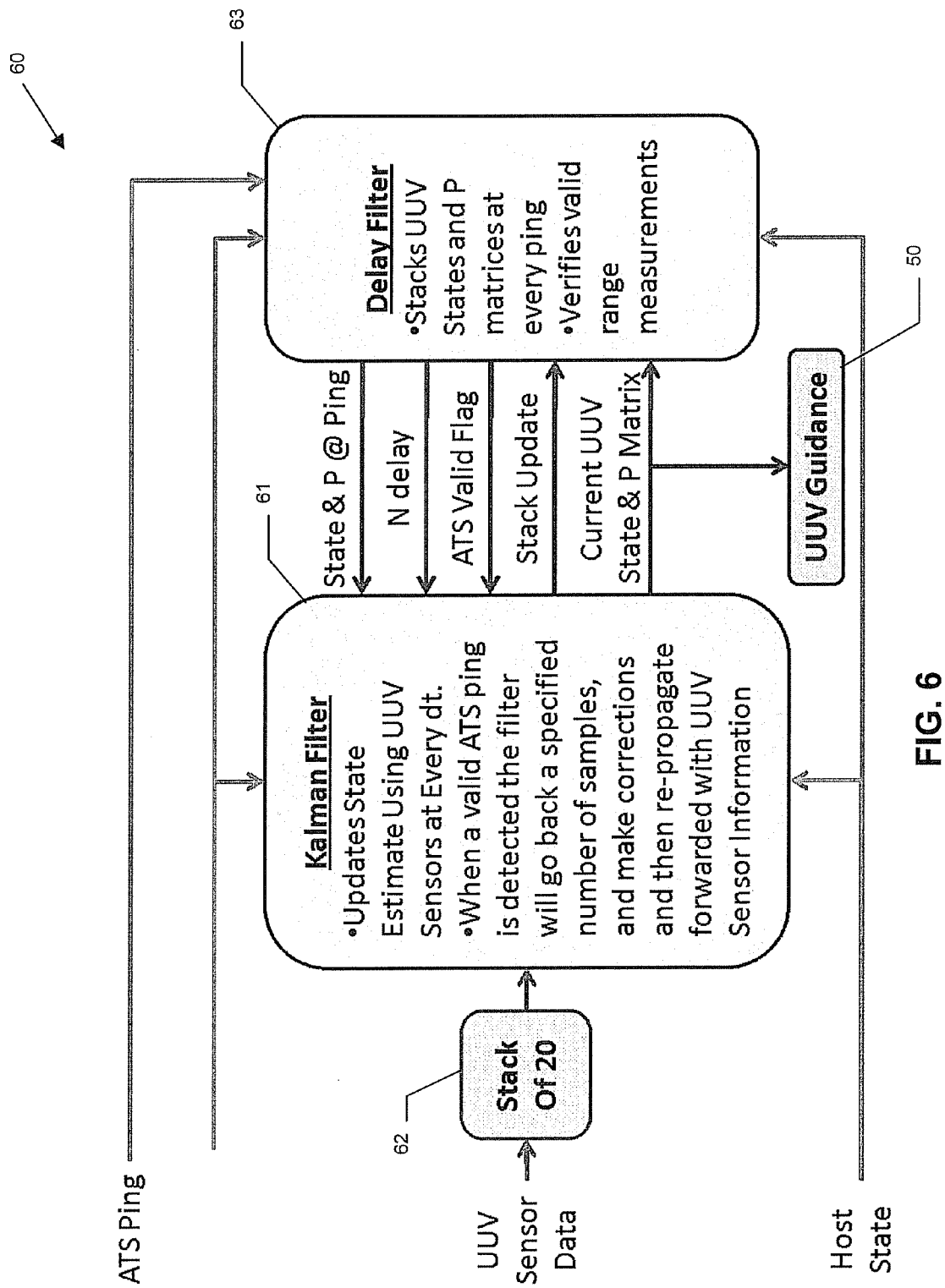
FIG. 6 is a schematic block diagram illustrating the filter module of the guidance controller of FIG. 3.

The problematic effects of sonar delay with respect to UUV position determination will be further understood with reference to FIG. 5. In the illustrated example, a sonar ping is emitted from the UUV 32 at time $t_0$ when the UUV is in a position 1 ("UUV 1"), and the host ship 31 is in its respective position 1 ("Host 1"). As the ping propagates through the water, the host ship 31 and UUV 32 move relative to one another. At a time $t_N$, the acoustic signal from the UUV sonar transducer 36 reaches the host sonar transducer 35. The range detected will therefore be the distance between the UUV position at time 1 and the host position at time $t_N$ as a result of the delay of the sonar ping to reach the host sonar transducer 35.

More particularly, sonar signals may experience a delay of approximately 1 second per kilometer of travel. In addition, a shallow water/near bottom acoustic environment is difficult for sonar measurements, as there is typically high ambient noise, and severe multi-path may result due to reflections off of the bottom and surface. Thus, if the host ship 31 is at a relatively far stand-off distance from the UUV 32, the position state estimates for the UUV may be significantly delayed and also sufficiently inaccurate such that a piloted or closed-loop guidance control system cannot reliably be navigated or guided from the stand-off position to the vicinity of the object of interest, as will be appreciated by those skilled in the art.

To overcome the inaccuracies caused by sonar delay/reflection, the guidance controller 37 further estimates a respective UUV position state relative to the host ship 31 at the initiation of at least some of the sonar range value measurements to define a series of successive UUV position state estimates, at Block 42. That is, when a sonar position measurement is initiated, a respective or corresponding UUV position state estimate may be generated. Thus, for example, at the time the guidance controller 37 causes the host sonar transducer 35 to emit a sonar ranging ping, it also causes a corresponding position state estimate for the UUV to be generated, as will be described further below.

Moreover, the guidance controller 37 is further advantageously configured to update UUV position state estimates in the above-noted series based upon completion of their respective sonar range measurements, and propagate the updates to subsequent UUV position state estimates in the series, at Block 43. Considered alternatively, the guidance controller 37 would estimate the position of the UUV at time $t_0$, and then go back and update the time $t_0$ position state estimate at time $t_N$ once the corresponding sonar signal is received to complete the sonar range measurement. For example, if the host ship 31' and UUV 32' are coupled by a wired (e.g., fiber optic) or Acoustic Communications (ACOMMS) link, as shown in FIG. 2, then the precise times at which a sonar signal is transmitted can be exchanged between the host ship and UUV.

The subsequent UUV position state estimate in the series (e.g., the time $t_1$ estimate), which is calculated based upon the original position state estimate for time $t_0$, may then be updated as well, and so on, to propagate throughout the remainder of the subsequent position state estimates in the series, as will be described further below. The guidance controller 37 may therefore advantageously control the propulsion and steering devices 33, 34 to more accurately guide movement of the UUV 32 relative to the host ship 31 based upon the updated position estimates, at Block 44, thus concluding the method illustrated in FIG. 4 (Block 45).

Figure 2:
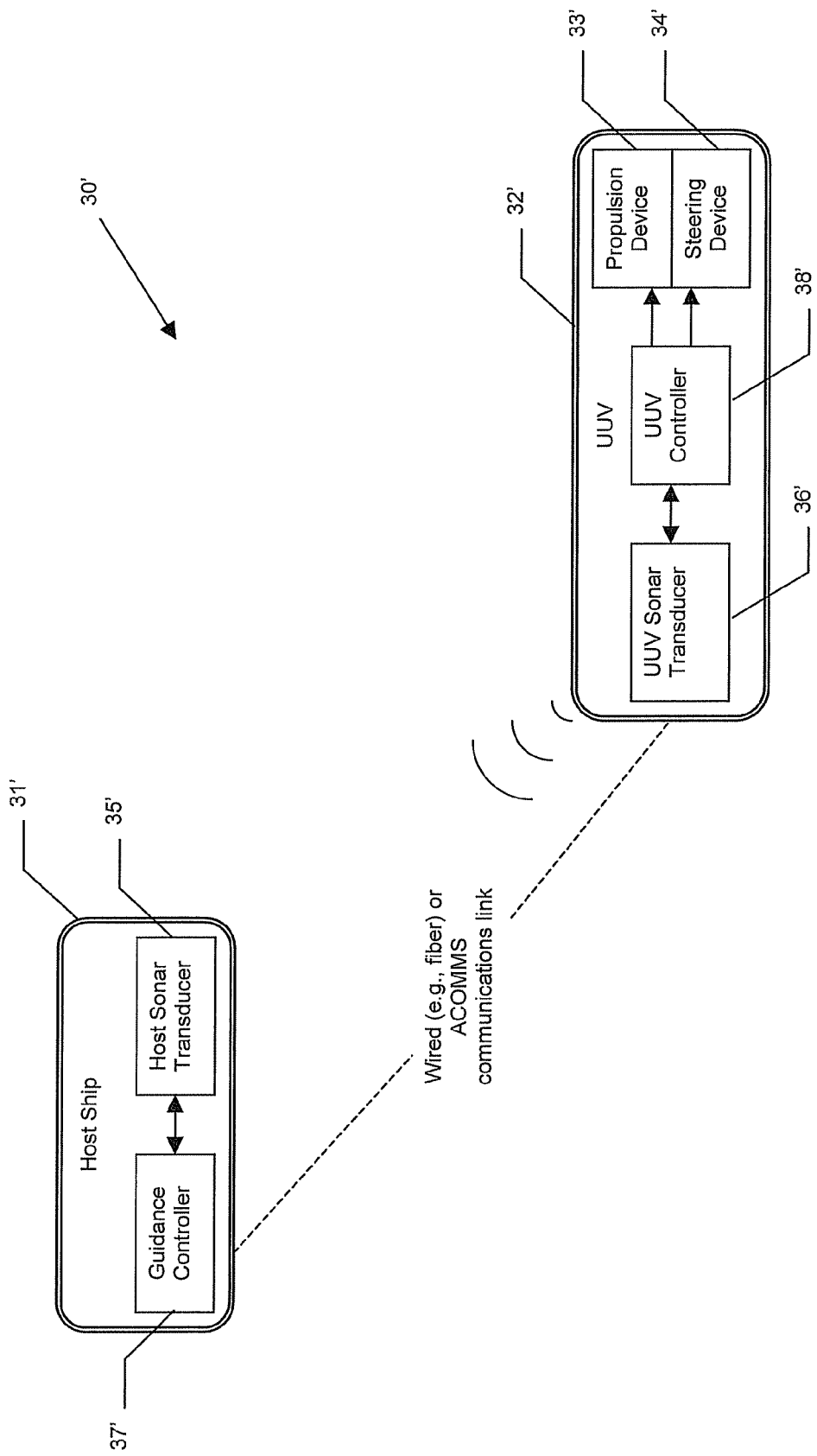
FIG. 2 is a schematic block diagram of an alternative embodiment of the underwater investigation system of FIG. 1.

Referring now additionally to FIG. 2, an exemplary embodiment in which the guidance controller 37' is carried by the host ship 31' is now described. This is particularly advantageous for "expendable" embodiments of the UUV 32', as this keeps the more expensive components of the guidance system on the host ship 31' so as not to unduly increase the cost of the expendable UUV. As such, in this configuration, a relatively inexpensive UUV controller 38' may be used in the UUV, which performs basic functions such as interfacing with the guidance controller 37' to relay operational information (e.g., bearing, propeller RPM, etc.), as well as controlling the propulsion device 33', steering device 34', and UUV sonar transducer 36'. However, it should be noted that in some embodiments the guidance controller or certain components/modules thereof may be carried on the UUV. That is, the various components of the guidance controller may be distributed between the host ship 31' and UUV 32' in some embodiments.

Figure 3:
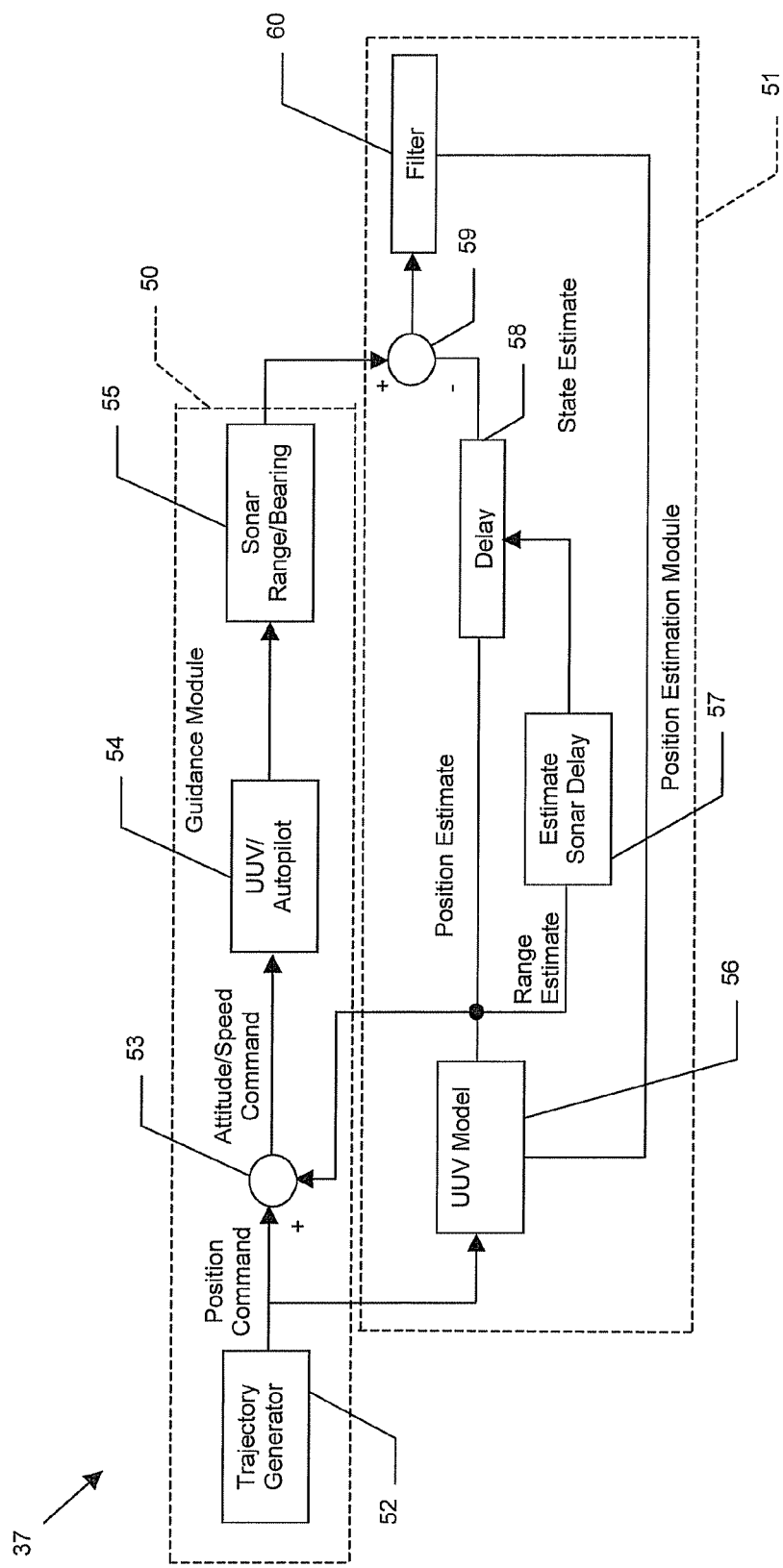
FIG. 3 is schematic block diagram illustrating an exemplary embodiment of the guidance controller of FIG. 1 in greater detail.

In the embodiment illustrated in FIG. 3, the guidance controller 37 illustratively includes a guidance module 50 and a position estimation module 51. The guidance module 50 illustratively includes a trajectory generator which generates basic steering information for the UUV 31, such as a bearing, dive angle, propeller speed, etc. The steering command data output from the trajectory module 52 is input to a summation module 53, the output of which is attitude/speed command data which is provided to a UUV/autopilot module 54. A sonar range/bearing module 55 is downstream from the UUV/autopilot module.

The position estimation module 51 illustratively includes a UUV model module 56, which receives the position command data from the trajectory generator 52 and generates the position state estimates noted above. The position state estimates are output to the summation module 53, along with a range estimate that is provided to a sonar delay estimation module 57, the output of which is provided as an input to a delay estimator module 58 along with the position state estimate. The output of the delay estimator module 58 is combined with the output of the sonar range/bearing module 55 via a summation module 59. The output of the summation module 59 is provided to a filter module 60, which provides feedback to the UUV model module 56.

Operation of the filter module 60 is now described with reference to FIGS. 6-9. The filter module 60 illustratively includes a Kalman filter 61 and a delay filter 63. Generally speaking, the Kalman filter 61 is configured to update the UUV position state estimates and propagate the updates to subsequent UUV position state estimates in the series, as noted above, while the delay filter 63 is configured to verify valid sonar range measurements for the Kalman filter.

More particularly, the Kalman filter 61 receives as inputs an acoustic tracking system (ATS) range and bearing from the sonar range/bearing module 55, UUV sensor data (which may be presented by way of a stack 62), and host data information. The UUV sensor data may include information from various sensors or devices on the UUV 32, such as heading information (e.g., from an analog or digital compass onboard the UUV), bearing rate sensor data, and propeller RPM. For non-expendable UUVs 32, more sophisticated sensors may also be included, such as a current sensor, for example. Furthermore, the host state data provides information on the position of the host ship 31, which is used to account for the delay in the sonar signal and thus the distance travelled by the host ship since the sonar signal from the UUV 32 is emitted.

The Kalman filter 61 updates the data estimate for the UUV 32 using the UUV sensor information at every sonar measurement increment (i.e., dt). Moreover, when a valid ATS ping is detected, the Kalman filter 61 goes back a specified number of samples, and makes corrections which are propagated forward with the UUV sensor information, as noted above. The Kalman filter 61 outputs a stack update to the delay filter 63, as well as current UUV state and covariance matrix information, which is also output to the UUV guidance module 50.

More particularly, in the Kalman filter 61, the state correction is broken into two sets of updates, one using solely the UUV sensors, and the other using solely the ATS sensor data. The UUV sensors, if available, are used at every dt to generate the UUV state predictions. When a valid ATS measurement is received, the Kalman filter 61 will then use the ATS data. However, as noted above, the data applies to the position of the UUV at some time in the past, i.e., the time when the sonar ping was emitted, so the Kalman filter 61 updates the UUV state at the time of emittance, not the current time. The Kalman filter 61 uses the UUV state and covariance matrix data 70 fed from the delay filter 63 to update the state estimate at that time. The Kalman filter 61 predicts and corrects the UUV state using the UUV sensor information for the next dt (which is stored in a stack 70, and accessed by the delay number N estimated in the delay filter 63) to current time. If the N delay is larger than the number of time steps between pings, the Kalman filter 61 will record the new UUV state and covariance matrix at each time the ping went out to feed to the delay estimator module 58.

The delay filter 63 also receives as input the ATS range and bearing data, as well as the host state information. Moreover, the delay filter 63 further receives ATS ping data. The delay filter 63 stacks the UUV position state estimate data as a matrix at every sonar ping, and also verifies valid range measurements. The delay filter 63 provides as outputs to the Kalman filter 61 a state and position estimate at the time of a sonar ping, the delay number N, and a flag to indicate whether an ATS ping is valid, as will be discussed further below.

Figure 7:
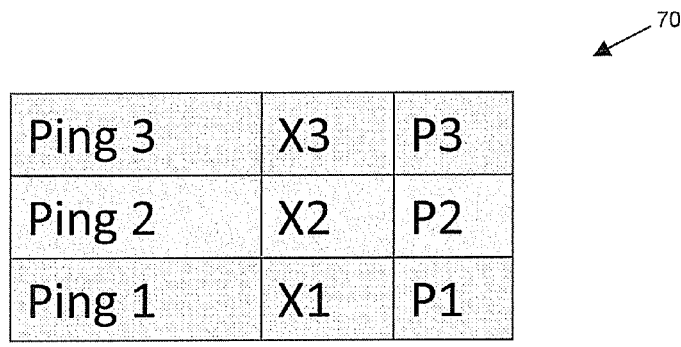
FIGS. 7-9 are schematic diagrams of computing stacks for storing and updating position state estimates utilized by the guidance controller of FIG. 3.

More particularly, a primary function of the delay filter 63 is to calculate the delay in the ATS data. The stack 70 of UUV state estimates and covariance matrix values is maintained. The stack 70 is populated at the time when a sonar ping is emitted, as seen in FIG. 7. In the illustrated example, the X and P state estimation values stored in the stack 70 may comprise mean and standard deviation values, as will be appreciated by those skilled in the art. However, in other applications the state information may be formatted differently, and need not necessarily be stored in a stack. However, the stack 70 is particularly advantageous because more than one ping may be in the water at a given time, depending upon the distance the UUV 32 is from the host ship 31. The state estimates are updated in the delay filter 63 so that the ATS measurements may be used to correct UUV 32 position state estimates. To support delay estimation, a number of acoustic data processing operations may be performed, including the elimination of bad data points (e.g., due to multi-path, reverb, etc.), as well as handling of dropped pings (i.e., if a ping is not detected).

Figure 8:
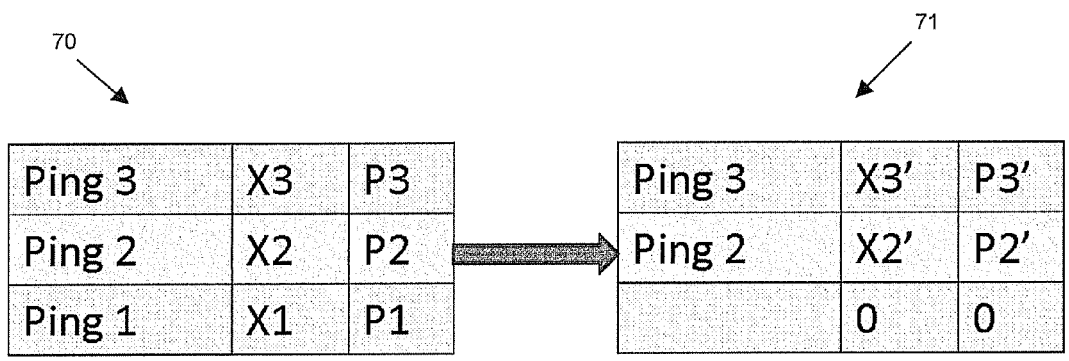
Figure 9:
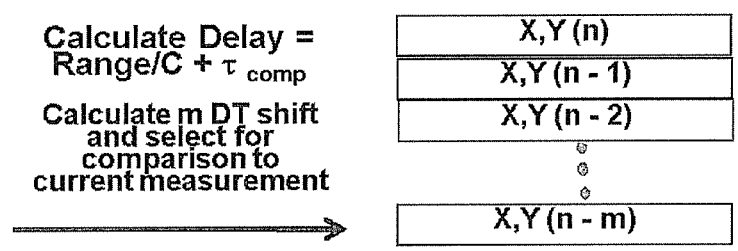

The stack 70 is a rolling stack, including both the state data and covariance matrix values. Each time the UUV 32 sends a response ping out to the host ship 31, the current position state and P matrix values are recorded in the stack. The ATS range data is compared to an estimated range that is calculated with UUV states in the stack 70 and current host data. If the measured range is within a tolerance of the estimated ranges, then that data is passed to the Kalman filter 61, and the delay filter 63 further calculates the number N of samples the ping is delayed. If the range R1 for ping 1 is received, the state estimates at ping 2 and ping 3 will be updated in the Kalman filter 61, as seen in FIG. 8, to provide an updated stack 71. The delay filter 63 thus provides a delayed output of the UUV model to compare to the sonar range measurements. A stack 90 is illustrated in FIG. 9, which shows how delay calculations are performed by the delay filter 63. The calculations may account for computational as well as acoustic delays. The delay is used to calculate the time interval shift for selection and comparison to the current sonar measurement.

The above-described UUV guidance functionality may advantageously be implemented in a computer-readable medium having computer-executable instructions for causing the guidance controller 37 to guide the UUV 32. The computer-readable medium may include the guidance module 50 configured to initiate sonar range measurements between the host ship 31 and the UUV 32 using the host sonar transducer 35 and/or the UUV sonar transducer 36. The computer-readable medium may further include a position estimation module 51 configured to estimate a respective UUV position state relative to the host ship 31 at the initiation of some or all of the sonar range value measurements to define a series of successive UUV position state estimates, which may be retained in the stack 70, as noted above. The position estimation module 51 updates the UUV position state estimates in the series based upon completion of their respective sonar range measurements, and propagates the updates to subsequent UUV position state estimates in the series. The guidance module 50 may also be configured to control the propulsion device 33 and the steering device 34 to guide movement of the UUV 32 relative to the host ship 33 based upon the updated position state estimates, as also described above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An underwater investigation system comprising:
    a host ship;
    an unmanned underwater vehicle (UUV) comprising a propulsion device and a steering device;
    at least one sonar system; and
    a guidance controller configured to
        initiate sonar range measurements between said host ship and said UUV using said at least one sonar system to emit sonar ranging pulses,
        for at least some of the sonar ranging pulses, estimate a respective UUV position state relative to said host ship at a time each sonar ranging pulse is emitted to define a series of successive UUV position state estimates,
        update UUV position state estimates in the series based upon reflections of the at least some sonar ranging pulses and completion of respective sonar range measurements, and propagate the updates to subsequent UUV position state estimates in the series, and
        control said propulsion device and said steering device to guide movement of said UUV relative to said host ship based upon the updated position state estimates.

2. The underwater investigation system of claim 1 wherein said at least one sonar system comprises a host transducer carried by said host ship and a UUV transducer carried by said UUV; and wherein said guidance controller is configured to initiate the sonar range measurements using ultra-short baseline (USBL).

3. The underwater investigation system of claim 1 wherein said guidance controller is carried by said host ship.

4. The underwater investigation system of claim 3 further comprising a wired communications link coupled between said UUV and said guidance controller.

5. The underwater investigation system of claim 3 wherein said guidance controller is configured to communicate with said UUV using an acoustic communications (ACOMMS) link.

6. The underwater investigation system of claim 1 wherein said guidance controller comprises a Kalman filter for updating the UUV position state estimates and propagating the updates to subsequent UUV position state estimates in the series.

7. The underwater investigation system of claim 1 wherein said guidance controller comprises a delay filter configured to verify valid sonar range measurements prior to updating the UUV position state estimates.

8. The underwater investigation system of claim 1 wherein said guidance controller is further configured to store the series of successive UUV position state estimates in a stack.

9. The underwater investigation system of claim 1 wherein the UUV position state estimates comprise mean and standard deviation position data.

10. A guidance controller for guiding an unmanned underwater vehicle (UUV) comprising a propulsion device and a steering device relative to a host ship, said guidance controller comprising:
   a guidance module configured to initiate sonar range measurements between said host ship and said UUV using at least one sonar system to emit sonar ranging pulses; and
   a position estimation module configured to
      for at least some of the sonar ranging pulses, estimate a respective UUV position state relative to said host ship at a time each sonar ranging pulse is emitted to define a series of successive UUV position state estimates, and
      update UUV position state estimates in the series based upon reflections of the at least some sonar ranging pulses and completion of respective sonar range measurements, and propagate the updates to subsequent UUV position state estimates in the series;
   said guidance module also configured to control said propulsion device and said steering device to guide movement of said UUV relative to said host ship based upon the updated position state estimates.

11. The guidance controller of claim 10 wherein said position estimation module is further configured to store the series of successive UUV position state estimates in a stack.

12. The guidance controller of claim 10 wherein the at least one sonar system comprises a host transducer carried by the host ship and a UUV transducer carried by the UUV; and wherein said guidance module is configured to initiate the sonar range measurements using ultra-short baseline (USBL).

13. The guidance controller of claim 10 wherein said position estimation module comprises a Kalman filter for updating the UUV position state estimates and propagating the updates to subsequent UUV position state estimates in the series.

14. The guidance controller of claim 10 wherein said position estimation module comprises a delay filter configured to verify valid sonar range measurements prior to updating the UUV position state estimates.

15. A method for guiding an unmanned underwater vehicle (UUV) comprising a propulsion device and a steering device relative to a host ship, the method comprising:
   initiating sonar range measurements between a host ship and an unmanned underwater vehicle (UUV) using at least one sonar system to emit sonar ranging pulses;
   for at least some of the sonar ranging pulses, estimating a respective UUV position state relative to the host ship at a time each sonar ranging pulse is emitted to define a series of successive UUV position state estimates;
   updating UUV position state estimates in the series based upon reflections of the at least some sonar ranging pulses and completion of their respective sonar range measurements, and propagating the updates to subsequent UUV position state estimates in the series; and
   controlling the propulsion device and the steering device to guide movement of the UUV relative to the host ship based upon the updated position state estimates.

16. The method of claim 15 further comprising storing the series of successive UUV position state estimates in a stack.

17. The method of claim 15 wherein the at least one sonar system comprises a host transducer carried by the host ship and a UUV device carried by the UUV; and wherein initiating the sonar range measurements comprises initiating the sonar range measurements using ultra-short baseline (USBL).

18. The method of claim 15 wherein updating comprises updating the UUV position state estimates and propagating the updates to subsequent UUV position state estimates in the series using a Kalman filter.

19. The method of claim 15 further comprising verifying valid sonar range measurements using a delay filter prior to updating the UUV position state estimates.

20. A non-transitory computer-readable medium having computer-executable instructions for causing a guidance controller to guide an unmanned underwater vehicle (UUV) comprising a propulsion device and a steering device relative to a host ship, the computer-readable medium comprising:
   a guidance module configured to initiate sonar range measurements between the host ship and the UUV using at least one sonar system to emit sonar ranging pulses; and
   a position estimation module configured to
      for at least some of the sonar ranging pulses, estimate a respective UUV position state relative to the host ship at a time each sonar ranging pulse is emitted to define a series of successive UUV position state estimates, and
      update UUV position state estimates in the series based upon reflections of the at least some sonar ranging pulses and completion of their respective sonar range measurements, and propagate the updates to subsequent UUV position state estimates in the series;
   the guidance module also being configured to control the propulsion device and the steering device to guide movement of the UUV relative to the host ship based upon the updated position state estimates.

21. The non-transitory computer-readable medium of claim 20 wherein the position estimation module is further configured to store the series of successive UUV position state estimates in a stack.

22. The non-transitory computer-readable medium of claim 20 wherein the at least one sonar system comprises a host transducer carried by the host ship and a UUV transducer carried by the UUV; and wherein the guidance module is configured to initiate the sonar range measurements using ultra-short baseline (USBL).

23. The non-transitory computer-readable medium of claim 20 wherein the position estimation module comprises a Kalman filter module for updating the UUV position state estimates and propagating the updates to subsequent UUV position state estimates in the series.

24. The non-transitory computer-readable medium of claim 20 wherein the position estimation module comprises a delay filter module configured to verify valid sonar range measurements prior to updating the UUV position state estimates.

* * * * *